(12) United States Patent
Usoskin

(10) Patent No.: US 7,253,959 B2
(45) Date of Patent: Aug. 7, 2007

(54) METHOD AND APPARATUS FOR DISTRIBUTING THE FLUX DENSITY OF A LIGHT FLOW

(76) Inventor: Olga Usoskin, Ludwig-Beck-Strasse 17, D-37075, Göttingen (DE)

( * ) Notice: Subject to any disclaimer, the term of this patent is extended or adjusted under 35 U.S.C. 154(b) by 137 days.

(21) Appl. No.: 10/850,142

(22) Filed: May 20, 2004

(65) Prior Publication Data

US 2005/0083578 A1     Apr. 21, 2005

(30) Foreign Application Priority Data

May 26, 2003     (DE)     ................. 103 24 111

(51) Int. Cl.
*G02B 27/14*     (2006.01)

(52) U.S. Cl. ............... 359/629; 362/297; 362/301; 362/346

(58) Field of Classification Search ............ 359/629; 362/297, 301, 346; 372/29.02, 29.022, 99
See application file for complete search history.

(56) References Cited

U.S. PATENT DOCUMENTS

| | | | |
|---|---|---|---|
| 2,267,948 A | 12/1941 | Rantsch | 95/2 |
| 4,641,920 A | 2/1987 | Matsuoka et al. | 350/173 |
| 5,165,080 A | 11/1992 | Healey | 359/636 |
| 5,363,228 A * | 11/1994 | DeJule et al. | 398/45 |

FOREIGN PATENT DOCUMENTS

EP     0274205 A2     7/1988

* cited by examiner

*Primary Examiner*—Hung Dang
*Assistant Examiner*—Joseph Martinez
(74) *Attorney, Agent, or Firm*—Thomas, Kayden, Horstemeyer & Risley, LLP

(57) ABSTRACT

For distributing the flux density of an input light flow (11), this input light flow is split-up in at least two light flows (12, 13) comprising different cross-sectional parts of the input light flow (11), and an output light flow (15) is output to which two partial flows each comprising a flux density fraction of at least one of the light flows (12, 13) are superimposed in one direction by means of a partial reflection at a partially reflecting optical surface (9). Additionally, at least one further output light flow (17) is output to which two further partial flows each comprising further flux density fractions of the same light flows (12, 13) as in case of the first output light flow (15) are superimposed in a further direction by means of the same partial reflection at the partially reflecting optical surface (9).

7 Claims, 13 Drawing Sheets

METHOD AND APPARATUS FOR DISTRIBUTING THE FLUX DENSITY OF A LIGHT FLOW

REFERENCE TO PARALLEL APPLICATION

This patent application claims the priority of parallel German Patent Aapplication DE 103 24 111.6 titled "Verfahren und Vorrichtung zur Verteilung der Stromdichte eines Lichtstroms" and filed on May 26, 2003.

FIELD OF THE INVENTION

Generally, the invention relates to a method and a device for distributing the flux density of an input light flow. More particular, the invention relates to a method for distributing the flux density of an input light flow, wherein the input light flow is split-up into at least two light flows comprising different cross-sectional parts of the input light flow, and wherein by means of a partial reflection two partial light flows are coaxially superimposing in one direction, each of which comprises a flux density fraction of at least one of the light flows, in order to output a first output light flow in a first direction. The invention also relates to a device for distributing the flux density of an input light flow, the device comprising a beam splitter having at least one reflecting surface, the beam splitter splitting-up the input light flow into at least two light flows which comprise different cross-sectional fractions of the input light flow; and a light flow output outputting a first output light flow, to which two partial flows are coaxially superimposed in one direction by a beam divider having a partially reflecting optical surface, each of the partial flows comprising a flux density fraction of at least one of the light flows.

BACKGROUND OF THE INVENTION

A method and an apparatus for distributing the flux density of an input light flow are known from U.S. Pat. No. 4,911,711. Here, an input light flow having a Gaussian distribution of its flux density over its cross-section is split-up into three light flows by means of two fully reflecting optical surfaces and along two splitting planes running in parallel to the optical axis of the input light flow and in parallel to each other splitting planes, each of the fully reflecting optical surfaces deflecting the light flow by a 90° whereas the central light flow passes between these two fully-reflection optical surfaces without deflection. The two deflected light flows are then coaxially superimposed with the not deflected light flow by means of two beam dividers. At the partially reflecting optical surface of each beam divider, the transmitted fraction of the flux density of the non-deflected light flow is superimposed with the reflected fraction of the flux density of the deflected light flow. The output light flow thus comprises partial flows of all three light flows. Prior to their combination with the not deflected light flow each of the deflected light flows is reflected four times, so that the deflected light flows are finally only shifted sideways, but are not inverted with regard to the not deflected light flow. By means of coaxially superimposing the light flows, the flux density of the input light flow is re-distributed in a sense of homogenizing the flux density distribution of the output light flow. The light flow loss caused by execution of this known method is comparatively high, as at each beam divider employed for the integration of two light flows some partial flows of both mentioned above light flows are lost. Actually, these are the flux density fractions of the not deflected light flow reflected by the partially reflecting optical surface, and the transmitted flux density fractions of the deflected light flows.

From German Patent DE 197 24 060 C2 both a method and an apparatus for distributing the flux density of an input light flow are known, by which it is intended to homogenize a Gaussian distribution of the flux density of a laser beam. To this end, the input light flow of the laser beam is split by a beam divider into two partial flows each of which comprises a flux density fraction from the total cross-sectional area of the input light flow. The partial flow reflected by the partially reflecting optical surface of the beam divider is converted by means of reflective and also refractive optical elements, as appropriate: at first, it is split-up into two light flows, next, each light flow is inverted by reflection, and then the inverted light flows are assembled again side-by-side. The reflected partial flow converted in this way and the not reflected partial flow are superimposed at the rear side of the same beam divider which divided the input light flow into the partial flows. As the converted partial flow exhibits a minimum in the area of the beam center, whereas the transmitted partial flow exhibits the Gaussian distribution of the flux density with a maximum in the area of the beam center, the superposition results in an output light flow homogenized regarding its flux density distribution. However, the loss of light flow is rather large also in this case because the beam divider, superimposing the converted partial flow with the transmitted partial flow, lets a flux density fraction of the converted partial flow pass through, which comes out of use.

A beam dividing apparatus which splits-up an input light flow into a number of light flows and which aligns these light flows in parallel to each other by means of partially reflecting and fully reflecting optical surfaces on transparent, plane-parallel plates arranged in parallel to each other to produce an output light flow having a broadened cross-section is known from German Patent DE 36 45 001 C2.

A beam splitter assembly comprising a transparent plane-parallel plate provided with partially reflecting and fully reflecting optical surfaces in different partial areas is also known from the German Patent Application DE 199 58 555 A1.

A beam divider whose partially reflecting surface comprises an array of a plurality of fully reflecting and fully transparent micro areas arranged side-by-side is known from Gottfried Schröder, Technische Optik, 8. Edition, Vogel Buchverlag, p. 43.

It is known from Y. Kawamura et al.: "A simple optical device for generating square flat-top intensity irradiation from a Gaussian laser beam", Optics Communications, Vol. 48, No. 1, p. 44 ff. to use a prism system for splitting-up an input light flow having a Gaussian distribution of the flux density over its cross-section into four light flows and for simultaneously aligning it in such a way that the cross-sections of the light flows are overlapping. There, where the cross-sections of the light flows are overlapping, the flux density distribution over the integral cross-section is comparatively homogeneous. The light flows, which are combined into the output light flow, are, however, not aligned coaxially here but in diverse directions. Thus, the combined output light flow is strongly divergent, and it exhibits no homogenization of its flux density except of the area in which the cross-sections of the light flows actually overlap.

Thus, there is a need for a method and an apparatus for distributing the flux density of an input light flow, in which losses of the light flow are considerable reduced, and in which a desired distribution of the flux density is nevertheless achieved not only in the area of a single plane, and in which the divergence of the output light flow is not increased to a relevant extent.

SUMMARY OF THE INVENTION

In one aspect, the invention provides a method of distributing the flux density of an input light flow, the method comprising the steps of: splitting-up the input light flow into at least two light flows comprising different cross-sectional parts of the input light flow; by means of partial reflections at a one and the same partially reflecting surface: coaxially superimposing two partial light flows, each of which comprises a flux density fraction of at least one of the light flows, in order to form a first output light flow in a first direction, and coaxially superimposing two further partial light flows, each of which comprises further flux density fractions of the same light flows as used for forming the first output light flow, in order to form a further output light flow in a further direction; and outputting the first output light flow and the further output light flow.

In a further aspect, the invention provides an apparatus for distributing the flux density of an input light flow, the apparatus comprising: a beam splitter having at least one mirror surface, said beam splitter splitting-up the input light flow into at least two light flows comprising different cross-sectional parts of the input light flow; a beam divider having a partially reflecting optical surface, said beam divider coaxially superimposing two partial light flows, each of which comprises a flux density fraction of at least one of the light flows, in order to form a first output light flow in a first direction, and coaxially superimposing two further partial light flows, each of which comprises two further flux density fractions of the same light flows as used for forming the first output light flow, in order to form a further output light flow in a further direction; and a light flow output outputting the first output light flow and the further output light flow.

In one more further aspect, the invention provides an apparatus for distributing the flux density of an input light flow, said apparatus comprising: a plane-parallel plate made of transparent material, said plate comprising a partially reflecting optical surface at its front side facing the input light flow, and a fully reflecting optical surface at its rear side, wherein the partially reflecting optical surface acts upon a light flow which comprises a half of the cross-sectional area of the input light flow, and wherein an other light flow which comprises the remaining half of the cross-sectional area of the input light flow is deflected by said fully reflecting optical surface through said transparent plane-parallel plate towards said partially reflecting optical surface, so that by means of partial reflections of both light flows at said partially reflecting optical surface two partial flows each of which comprises a half fraction of the flux density of both light flows are coaxially superimposed in a first direction in order to form a first output light flow, and two further partial light flows each of which comprises the other half fraction of the flux density of both light flows are coaxially superimposed in a further direction in order to form a further output light flow.

In a sub-aspect, the invention provides an arrangement consisting of a multitude of individual apparatuses which are arranged one behind the other. Further, an arrangement consisting of such an apparatus and a mirror is provided.

So far as the formulation "at least one . . . " is used within the present patent application, especially within the claims, this is not intended to mean that other formulations here which do without the term "at least" are to be interpreted in a sense of "a single . . . ". Instead, any reference to "a . . . " principally only means that "one . . . " is existing, which does not exclude the existence of "more than one . . . ".

DESCRIPTION OF THE INVENTION

In the new method, two output light flows are produced by means of one partial reflection, in that both the reflected partial flow of a light flow which falls onto the corresponding partially reflecting optical surface in one direction and the transmitted partial flow of a light flow which falls onto the corresponding partially reflecting optical surface in other direction, and the transmitted partial flow of the first and the reflected partial flow of the second light flow are each superimposed into one output light flow. Thus, no more significant losses of light flow are caused by the partial reflection. All reflected and transmitted partial flows of the incident input beam are completely used. At the same time, in each case partial flows of different light flows are superimposed by the partial reflection so that their sum at the respective output light flow results in a different, i.e. normally a homogenized, distribution of the flux density.

The two output light flows produced by the same partial reflection can be output separately from each other. Thus, the functionality of a homogenization of the distribution of the flux density and of a beam division can be achieved simultaneously. However, it is also possible to align the two output light flows from the partial reflection in parallel directions side-by-side, in order to form an integral output light flow. Upon a precise alignment of both output light flows the integral output light flow exhibit a closed homogeneous distribution of its flux density over its cross-section. Here, the divergence of the integral output light flow is at most only negligibly higher than the divergence of the input light flow.

The light flows, into which the input light flow is split-up according to the new method prior to the formation of the output light flows from their partial flows, can be produced by means of reflections, each of which only acts upon the portion of the cross-section of the input light flow belonging to the respective light flow. In this way, the light flows are individually split away from the input light flow. The remainder of the input light flow can be one further light flow.

The reflection, by which two light flows are split-up, can be performed at the same partially reflecting optical surface, as the partial reflection, by which the partial flows of these light flows are subsequently superimposed again. Splitting the light flows may also be performed by one or a plurality of further fully or partially reflecting optical surfaces.

It is preferred, if each light flow covers an equal cross-sectional fraction with regard to the total cross-sectional area of the input light flow. By means of combining partial flows of the light flows having equal cross-sectional areas, the homogenization of the flux density distribution in the output light flows is simplified.

Further, it is preferred, if the input light flow is split-up into n light flows, n being an even integer number. An even integer number of the light flows is preferred, because partial flows of two incident light flows are superimposed by each partial reflection.

In preferred embodiments of the new method, partial flows of n light flows are superimposed into n output light flows, each of which comprises a partial flow of each light flow.

Further, it is preferred, if the partial flows superimposed into the output light flows comprise equal light flow fractions of each light flow. Each partial flow which is superimposed into an output light flow may actually comprise a flux density fraction of $\frac{1}{2}^m$ of one of the light flows, m being an integer number. This requirement implies that the number of the light flows is equal to $2^m$. Small deviations from these values as well as differences up to an order of some percent between the light flow fractions of the individual light flows in the partial flows superimposed into one output flow, which may, for example, result from (different) intrinsic light flow losses in the employed optical elements, are irrelevant.

As partial flows comprising fractions of different light flows are superimposed in the new method, no axial inversion of the flux density distribution of the individual light flows is required in order to achieve a homogenization of the output light flow. Instead, the homogenizing effect of the new method is based on splitting the input light flow into light flows and on combining the light flows which are shifted along a normal to the splitting plane and thus caused to overlap.

Doing without an axial inversion in the new method has the effect that the numbers of reflections, including any reflection at a partially reflecting optical surface, are the same for each of the partial light beams superimposed with each other, or differ by an even integer number.

According to new method, the optical paths of the partial flows, which are superimposed with each other, can be adjusted to a predetermined difference in length including zero. By the controllable difference in length, various aims can be achieved. In case of a short coherent length of the input light flow, an exceeding difference in length of the optical paths of the partial flows can be used to avoid an interference of the partial flows after their combination, which is possible, if the partial beams are combined in a sense of a superposition. By means of the difference in length, it is, however, also possible to vary the effective pulse duration of an output light beam in case of an input light beam having a fixed pulse duration, the minimum pulse duration of the output light flow, which corresponds to the pulse duration of the input light flow, being achieved at a difference in length of zero. Each difference in length different from zero results into an extension of the effective pulse duration of both output light flows resulting from the combination of the partial flows.

The new method can also be executed several times in sequence with regard to one input light flow, at least one output light flow from by a preceding execution of the method being used as an input light flow in one of the following executions of the method. The output light flow which is employed as an input light flow in one of the following executions of the method can be a single output light flow or also an integrated output light flow.

In case of two subsequent executions of the method, the respective input light flow can be split along splitting planes which are either running in parallel or perpendicularly with regard to each other. In order to optimize the homogenization of the flux density distribution by the subsequent execution of the method with parallel splitting planes, the distance between the splitting planes in the subsequent execution of the method should differ by, for instance, a factor of 2 or ½ from the distance between the splitting planes in the preceding execution of the method, or the splitting planes in the subsequent executions of the method should be offset, for instance, by half of their distance in parallel to each other. With splitting planes running perpendicularly to each other, the central splitting planes should intersect on the optical axis of the input light flow.

An especially preferred embodiment of the new method is that the method is executed within the cavity of a laser or a laser amplifier. Upon generation of the laser beam with the laser or the laser amplifier, respectively, homogenization of the laser beam over its cross-section is provided from the beginning, so that a subsequent execution of the method outside the laser or laser amplifier, respectively, is not required for the emerging laser beam.

Regarding the details of the new apparatus, we may refer to the previous description of the new method. In the following, however, we will point out specific constructional features of the new apparatus, which are not yet covered.

In the new apparatus, "light flow output" is a functional indication, which shall not exclude that the apparatus is turned around and the input light flow is introduced there, where previously an output light flow came out. Particularly, those embodiments of the new apparatus, in which the light flow output outputs an integrated output light flow, are, as a rule, completely symmetric with regard to their function, so that it is insignificant where the input light flow is introduced in order to get a homogenized output light flow at another end of the apparatus which is designated as a light flow output here. Thus, it is also possible to direct an output light flow of the new apparatus back into its light flow output by means of a mirror, this output light flow represents a new input light flow which is treated in the apparatus once more according to the new method and which is then output again at the other end of the apparatus as a new output light flow. Accordingly, the new method may be executed in sequence more than once with regard to one input light flow by means of an arrangement consisting of a new apparatus and a mirror.

In order to suppress unwanted interferences of the light flows superimposed by the beam divider, the new apparatus may comprise at least one polarizing or partially polarizing beam divider.

Another measure to suppress unwanted interferences of the superimposed partial flows is to use a beam divider, whose partially reflecting optical surfaces are formed as an array of a multitude of fully reflecting and fully transparent micro areas arranged side-by-side. Upon combining the partial flows, which are originating from the two light flows falling onto one of such beam dividers, in two different directions, the partial flows are not superimposed with each other within the same volumes but within parallel spatial areas arranged side by side, which even with a minor divergence of the partial flow practically exhibit no relevant overlapping. This helps to prevent undesirable interferences of the superimposed partial flows.

In particularly preferred embodiments of the new apparatus, several optical surfaces, particularly, at least one partially reflecting optical surface and one fully reflecting optical surface, are arranged in parallel to each other. It is also possible that all partially reflecting optical surface and all fully reflecting optical surface are arranged in parallel to each other. The optical surfaces exhibit an inclined orientation with regard to the optical axis of the input light flow, the angle of inclination being usable for adjusting the aperture of the new apparatus with regard to the the input light flow.

Furthermore, it is particularly preferred, if the new apparatus comprises at least one partially or fully reflecting optical surface which is a partial area of a flat optical surface extending over the cross-sectional parts of the input light flow belonging to several light flows. The flat optical surface can actually extend over the cross-sectional parts of all light flows and also all partial and output light flows. Typically, the flat optical surface is a surface of a plane-parallel transparent plate comprising two flat optical surfaces having corresponding extensions.

The partially or fully reflecting optical surfaces of the new apparatus can be provided as coatings of partial areas of the flat optical surface having different reflection coefficients. Within those partial areas, in which the flat optical surface does not form partially or fully reflecting optical surfaces, but through which light flows are nevertheless passing through, the flat optical surface is preferably coated with an antireflection coating.

The partially reflecting and fully reflecting optical surfaces of the new apparatus can be provided at one single plane-parallel transparent plate, in which case each flat optical surfaces on both sides of the plate comprises at least one partially or fully reflecting optical surface. If the optical surfaces are provided at a plurality of plates arranged in parallel to each other, it is preferred that the distance between the plates is defined by at least one plane-parallel spacer, which exhibits a same coefficient of thermal expansion as the plates. Precisely identical thermal expansion coefficients are not required. It is sufficient, if the thermal expansion coefficients are equal to such an extent that the actual thermal expansions do not excessively deviate from each other in the relevant temperature range. By tuning of the thermal expansion coefficients maladjustment of the new apparatus caused by effects of thermal expansion is prevented, such thermal influences being unavoidable in applications related to high energy laser beams.

BRIEF DESCRIPTION OF THE DRAWINGS

The invention is illustrated and described in more detail by means of some embodiment examples which are depicted in the drawings. Here.

DESCRIPTION OF PREFERRED EMBODIMENTS

Figure 1:
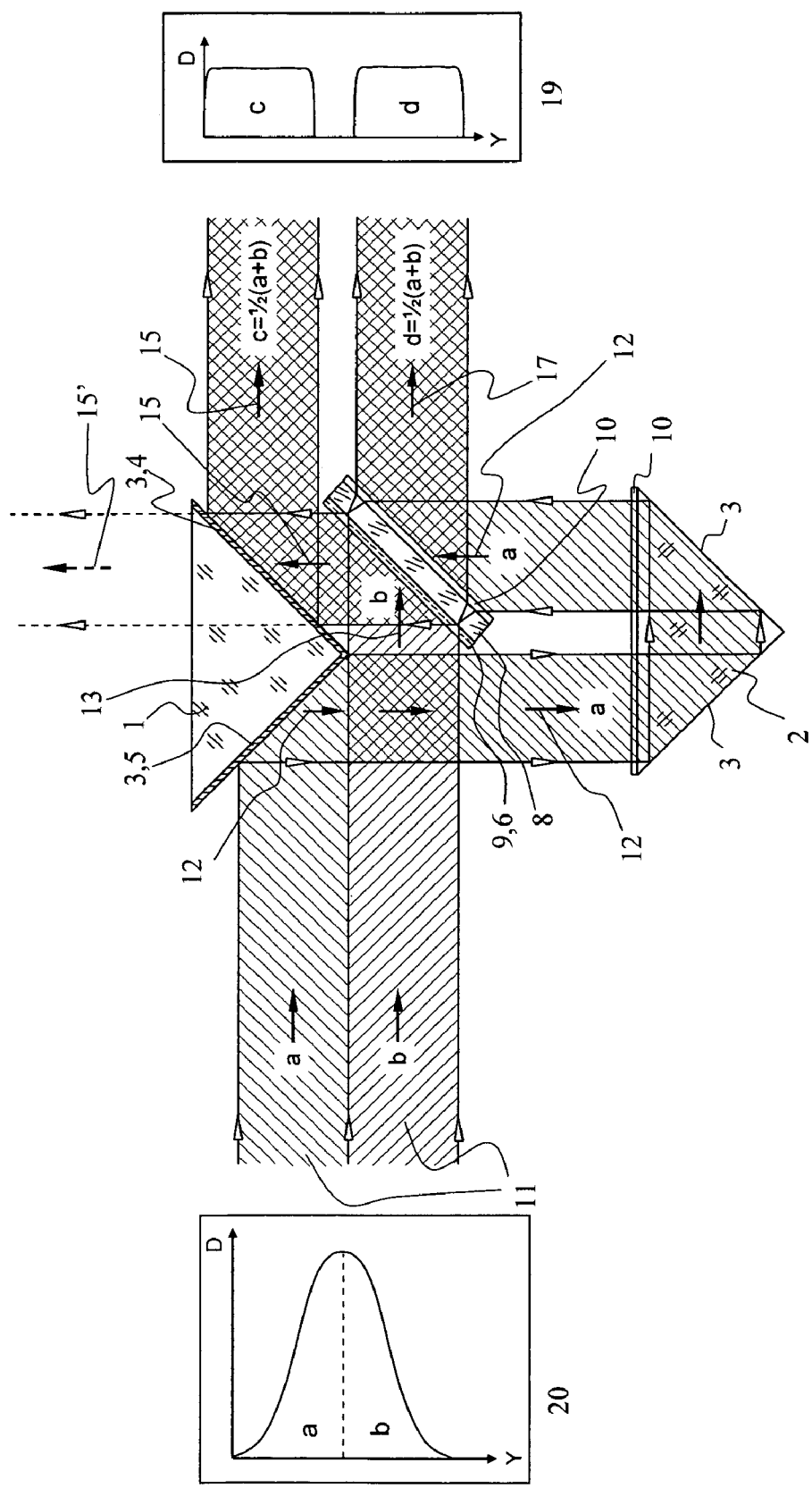
FIG. 1 shows a schematic representation of a first embodiment of the apparatus according to the invention having light flow splitting and homogenizing function.

The apparatus depicted in FIG. 1 serves for converting an input light flow 11 with a Gaussian distribution 20 of the flux density into two equal output light flows 15, 17 with a homogeneous distribution 19 of the flux density. The apparatus comprises two prisms 1, 2. Prism 1 positioned higher above in FIG. 1 is coated with fully reflecting coatings which form outer fully reflecting optical surfaces 3. At lower prism 2, the full reflection takes place by means of total reflection at fully reflecting inner optical surfaces 3. The base surface of prism 2 turned to the top here is provided with an antireflection coating 10. Further, the apparatus comprises further a beam divider 6 comprised by a partially reflecting optical surface 9 positioned upon a transparent plate 8. The rear surface of plate 8 is coated with an antireflection coating 10. The partially reflecting optical surface 9 includes a partially polarizing optical multilayer which essentially exhibits equal transmission and reflection coefficients for non-polarized light.

The incident input light flow 11 is split into two light flows 12 and 13 due to a full reflection at the first fully reflecting optical surface 3 of the prism 1, which covers a cross-sectional fraction of the input light flow 11 of about 50% and which thus acts as a mirror surface of a beam splitter 5. Then, the light flow 12 is deflected by means of two reflections at the fully reflecting optical surfaces 3 of the prism 2 in such a way that it covers the same area as the light flow 13 at the partially reflecting optical surface 9. By means of the partial reflections of the light flows 12 and 13 at the partially reflecting optical surface 9 two output light flows 15 and 17 are formed. In the course of forming the output light flow 15 a reflected partial flow being a flux density fraction of the light flow 13 and a transmitted partial flow being a flux density fraction of the light flow 12 are coaxially superimposed in one direction. The second output light flow 17 is formed by means of coaxially combining other partial flows of the same light flows 12 and 13, namely, a reflected component of the light flow 12 and a transmitted component of the light flow 13, in another direction. The corresponding directions are defined for the partial flows outside the plate 8. Within the plate 8, the directions are changing according to the refraction law. With a 50% reflecting optical surface 9, the output light flows 15 and 17 include partial flows of each light flow 12, 13, each of which comprises a flux density fraction of about a half of the light flows 12, 13. Because of light absorption and scattering at the reflecting surfaces, the flux density fractions can be smaller than the calculated half by 1-2%.

The numbers of the reflections, including any reflection at the partially reflecting optical surface 9, for each of the partial light beams superimposed with each other differ by two in case of the output light flow 15 and by four in the case of output light flow 17, i.e. they each time differ by an even integer number. Thus, the partial flows superimposed into the output light flows 15, 17 are shifted with regard to each other in respect of the position of their parent light flows 12, 13 in the input light beam 11, but they are not side-inverted with regard to each other in respect of the distribution of their flux density over their cross-sections. This is a precondition for homogenizing the distribution of the flux density in the output light flows by means of the coaxial combination.

In order to control the pulse duration of the output light flows 15, 17 in case of a pulsed input light flow 11, the optical paths of the partial flows being superimposed can be adjusted to a pre-determined difference in length by a variation of the angles of the prisms 1, 2 together with a variation of the inclination of the plate 8 or/and by a variation of the distance between the prisms 1 und 2. An increase of the pulse duration of the output light flows 15, 17, however, is provided at an expense of the homogeneity of the flux flow distribution at each point in time of a prolonged pulse.

With the aid of a light flow output 4 comprising the second fully reflecting optical surface 3 of the prism 1, the output light flow 15 is deflected in such a way that the output light flows 15 and 17 are aligned in parallel directions side-by-side, and are output separately from each other.

As compared to the Gaussian distribution 20 of the flux density of the input light flow 11, the output light flows 15 and 17 exhibit a clear improvement in respect of the homogeneity of the distribution 19 of their flux density over their cross-sections. The distribution 19 of the flux density D of the output light flows 15 and 17 as compared to the corresponding distribution 20 of the flux density of the input light flow 11 is plotted in FIG. 1 over one cross-sectional axis Y. The non-homogeneity of the distribution 19 of each output light flow 15 and 17 amounts to only 4% at a total light loss of about 1.5% in the apparatus according to FIG. 1. As compared to known methods, the intensity losses are lower at least by factor of four. Thanks to the adjustability of the difference in length of the optical paths of the partial flows, the pulse duration can be increased from 0.2 to 6 ns in case of a pulsed input light flow 11 or laser beam.

The partially reflecting optical surface 9 allows for a reduction of the interference effects for each couple of superimposed partial flows. The requirements with regard to the degree of polarization of the beam dividing optical surface 9 increase with increasing coherent length of the input light flow 11. In the case of a polarized input light flow 11, the plane of polarization has to be inclined at 45° with regard to the plane of incidence of the input light flow 11. As an alternative solution of the interference problem with an increased degree of coherence, a beam divider 6 may be provided, in which the partially reflecting optical surface 9 comprises an array of a multitude of fully reflecting and fully-transparent micro areas arranged side-by-side. In this case, each of the partial flows, which are to be superimposed, is output as a fine-profiled light flow, the fine-profiled light flows originated from different partial flows not being superimposed, i.e. not overlapping within the same volumes.

A variant of the embodiment example of the apparatus shown in FIG. 1 without the mirror being formed by the second fully reflecting optical surface 3 (i.e. only the half of the prism 1 on the left hand side of FIG. 1 is provided) allows for outputting two output light flows 15' and 17 running at a right angle, the output light flow 15' being a straight continuation of the output light flow 15 behind the beam divider 6.

Figure 2:
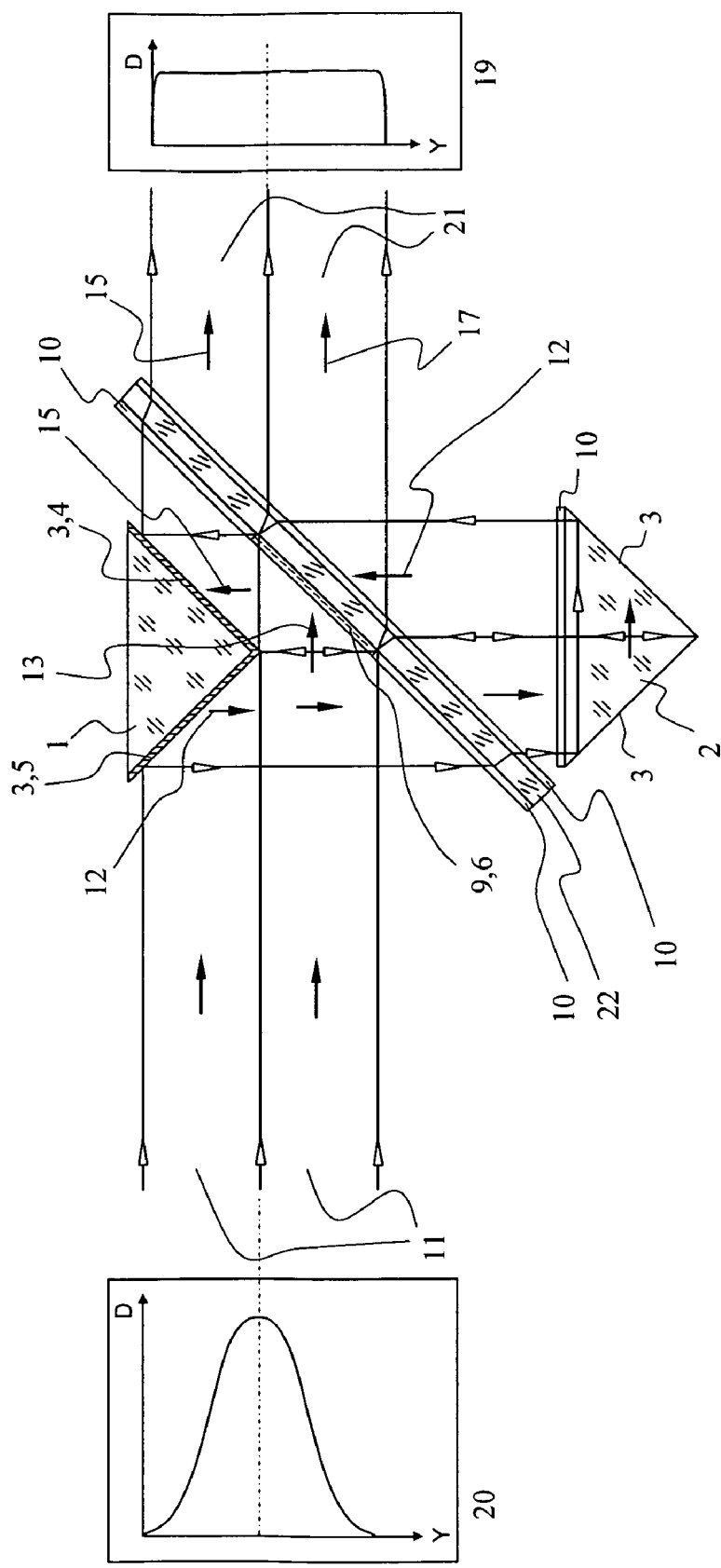
FIG. 2 shows a schematic representation of a variant of the first embodiment of the apparatus according to the invention having homogenizing function.

The embodiment of the apparatus according to FIG. 2 aligns the output light flows 15, 17 in parallel directions directly next to each other in such a way that an integral output light flow 21 is formed. The beam divider 6 of this embodiment is based on a transparent plate 22 having optical surfaces which extend over the cross-sections of the light flows 12, 13 as well as of the output light flows 15, 17. A partial area, in which a partially polarizing multilayer is provided on one optical surface of the plate 22, forms the partially reflecting optical surface 9 of the beam divider 6, which corresponds to the lower half of the cross-section of the input light flow 11, i.e. to the light flow 12, here. The remaining partial areas of the same surface as well as the rear surface of the plate 22 are coated with antireflection layers 10.

The integrated output light flow 21 is characterized by a homogeneous distribution 19 of its flux density over its cross-section. The non-homogeneity of the distribution 19 over the total cross-section amounts to 4% at a light flow loss of 2.8%. All other properties of both apparatuses according to FIG. 2 and FIG. 1 correspond to each other.

Figure 3:
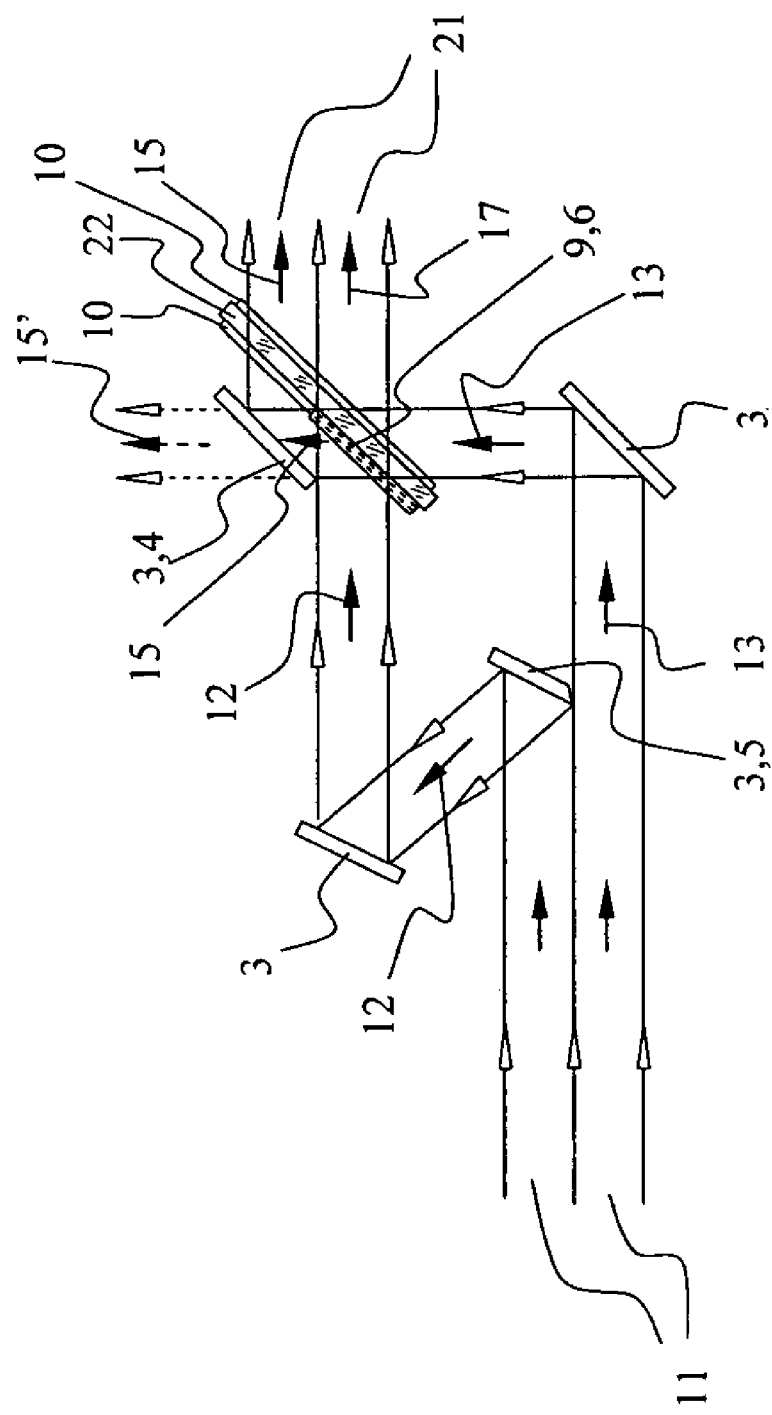
FIG. 3 shows a schematic representation of a second embodiment of the apparatus according to the invention having homogenizing function.

As the one shown in FIG. 2, the apparatus according to FIG. 3 serves for converting the input light flow 11 into a homogeneous integral output light flow 21, which is assembled of two equal homogeneous parallel output light flows 15 and 17. To simplify the description, the influence of the refraction in the plate 22 is not shown. The apparatus comprises four mirrors which form fully reflecting optical surfaces 3, and a beam divider 6 which is similar to that one of the embodiment according to FIG. 2. The fully reflecting optical surface 3 serves as a beam splitter 5, which splits-up the input light flow 11 into two light flows 12 and 13. After their deflection at other fully reflecting optical surfaces 3, the light flows 12 and 13 reach the beam divider 6. The beam divider 6 causes the coaxial combination of the partial flows of the light flows 12 and 13 into the output light flows 15 and 17 in the way described in connection with FIG. 2. The light flow output 4 comprises the fully reflecting optical surface 3, by means of which the output light flow 15 is aligned in parallel to the output light flow 17, in order to output the integral light flow 21 at one exit.

The numbers of reflections, including any reflection at a partially reflecting optical surface, for each of the partial light beams superimposed with each other differ by two in the case of the output light flow 15, and are equal in the case of the output light flow 17. The optical paths of the partial flows which are superimposed with each other can be adjusted to a pre-determined difference in length by variations of the positions und inclinations of the mirrors. The considered embodiment allows for varying the difference in length in a wide range. This range is different from the ranges of the other embodiments in such a way that it in addition to positive and negative values also includes a zero value. This allows to keep the pulse duration of the input light flow 11 without changes in the course of homogenizing. The remaining non-homogeneity of the distribution of the total output light flow 21 amounts, as before, to 4% at about a light flow loss of about 3%.

A variant of the apparatus shown in FIG. 3, whose light flow output 4 do not comprise the last fully reflecting optical surface 3, allows for outputting two homogeneous output light flows 15' and 17 running at a right angle. In this variant, the apparatus serves as a homogenizing beam splitter with a controllable prolongation of the pulse duration.

Figure 4:
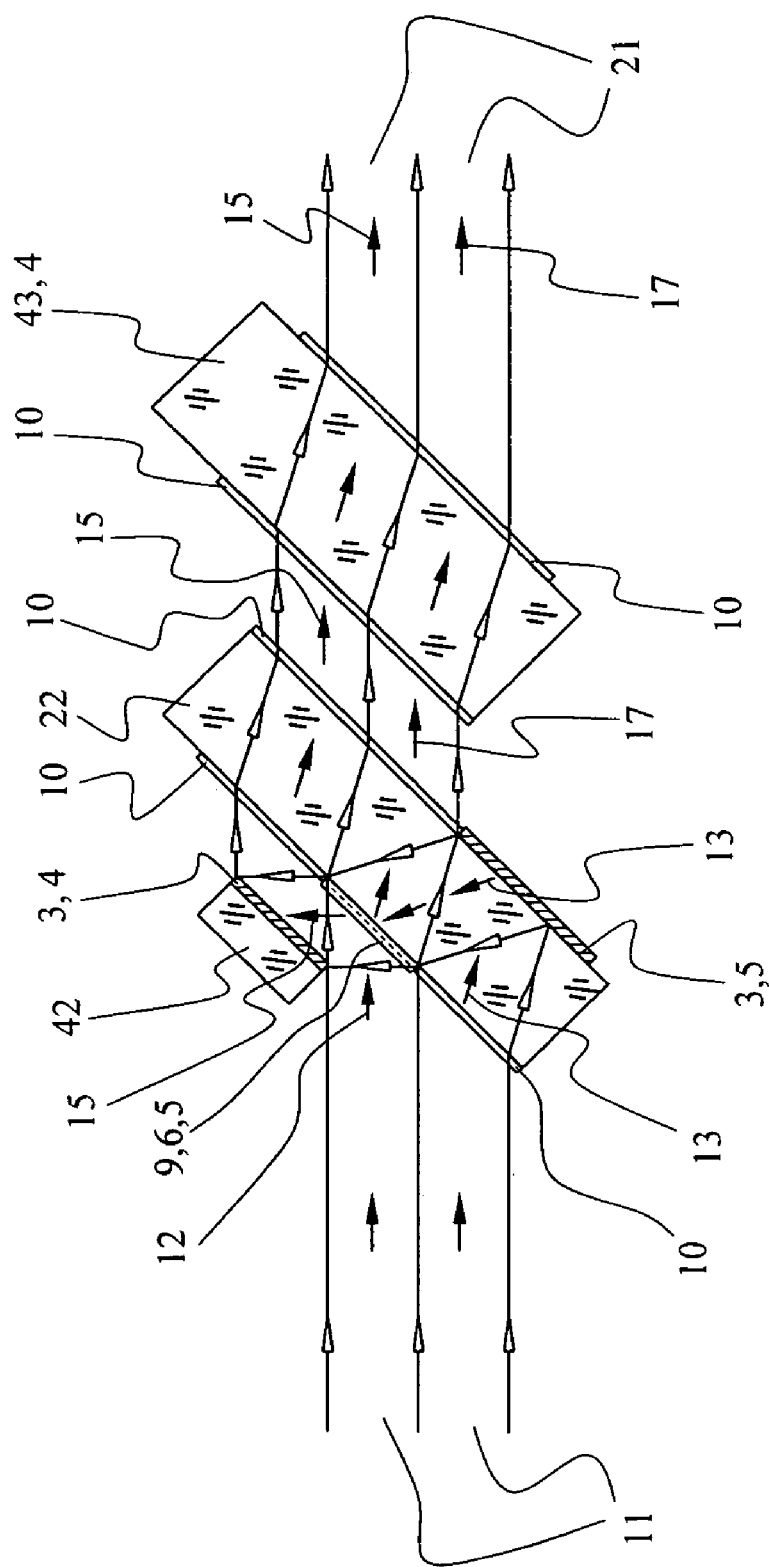
FIG. 4 shows a schematic representation of a third embodiment of the apparatus according to the invention having homogenizing function.

FIG. 4 shows a further embodiment of the apparatus according to the invention, which forms an integrated homogeneous output light flow 21. The apparatus comprises reflecting optical surfaces arranged in parallel to each other. In one partial area, a fully reflecting multilayer is coated onto the rear surface of the plane-parallel transparent plate 22, which there forms a fully reflecting surface 3. The optical surfaces of plate 22 extend over all cross-sectional parts of the input light flow 11. At that side of plate 22 opposing the fully reflecting multilayer a partial area is provided with the 50% reflecting optical surface 9, which serves as a beam divider 6 and here also as a part of the beam splitter 5. The remaining partial areas of plate 22, which are within the optical aperture are coated with antireflection layers 10. The transition areas between the reflecting or partially reflecting and the transmitting partial areas have to be as "steep" as possible in order to ensure a precise splitting and combination of the light flows. In the considered embodiment, the transition widths at the boundaries of the surfaces 3 and 9 are smaller than 10 µm. The light flow output 4 is based on a fully reflecting optical surface 3, which is formed by an optical coating on a substrate 42, and on a compensation plate 43, which compensates for the geometrical shift of the output light flows 15 and 17 as compared to the input light flow 11. The plane-parallel surfaces of the compensation plate 43 are provided with antireflection coatings 10 in the area of optical aperture. In the apparatus, the distances between the plates 22, 42 and 43 are defined by a set of plane-parallel spacers made of the same material as the plates (not shown in FIG. 4).

The input light flow 11 is split-up into two light flows 12 and 13 by means of a reflection at the partially reflecting optical surface 9 of the beam divider 6 or at the fully reflecting optical surface 3 at the rear surface of the plate 22, respectively. The light flow 13 is directed to the beam divider 6 by means of a reflection at the fully reflecting optical surface 3 at the rear side of the plate 22. The formation of the coaxially superimposed partial flows or output light flows 15 and 17 follows the above-described method according to FIG. 2 or FIG. 3. The numbers of reflections for each of the partial beams superimposed with each other are equal in case of the output light flow 15, and differ by two in the case of the output light flow 17. In the embodiment of the apparatus according to FIG. 4, the difference in length of the optical paths of the partial flows is essentially defined by an angle of inclination of the plane-parallel system with regard to the direction of the input light flow 11. Here, the angle of inclination is defined as an angle of incident of the input light flow. With an increasing angle of inclination, the difference in length decreases and consequently the effective pulse duration is reduced. The non-homogeneity of the distribution of the total output light flow 21 amounts, as before, to 4% at a light flow loss of about 3%.

Figure 5:
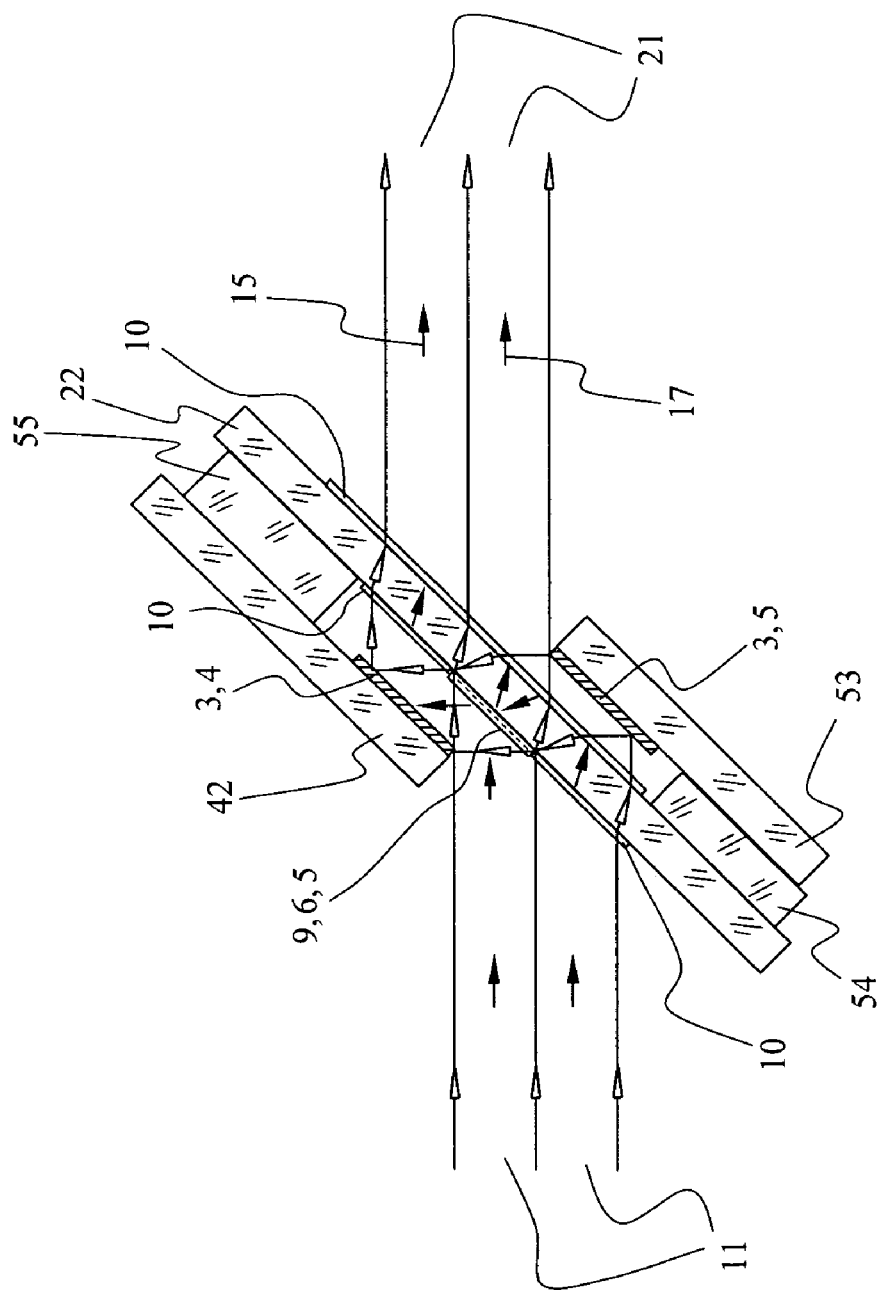
FIG. 5 shows a schematic representation of a variant of the third embodiment of the apparatus according to the invention.

In FIG. 5, a variant of the apparatus according to FIG. 4 is depicted. Here, the apparatus comprises no compesation plate and differs by a separate arrangement of the reflecting elements on several plates: the first fully reflecting optical surface 3 is formed on a separate substrate 53, and the plate 22 is only provided with the partially reflecting optical surface 9 and the antireflection coating 10. The precise distances between the plates 22 and 53 as well as between the plates 22 and 42 are ensured by plane-parallel spacers 54 and 55, which exhibit a thermal expansion coefficient similar to that of the plates. This allows for an adjusting step, which enables an adjustment of the required optical aperture by shifting the plates 42 and 53 in parallel with regard to the plate 22 together with changing the inclination of the system based on these plates.

Figure 6:
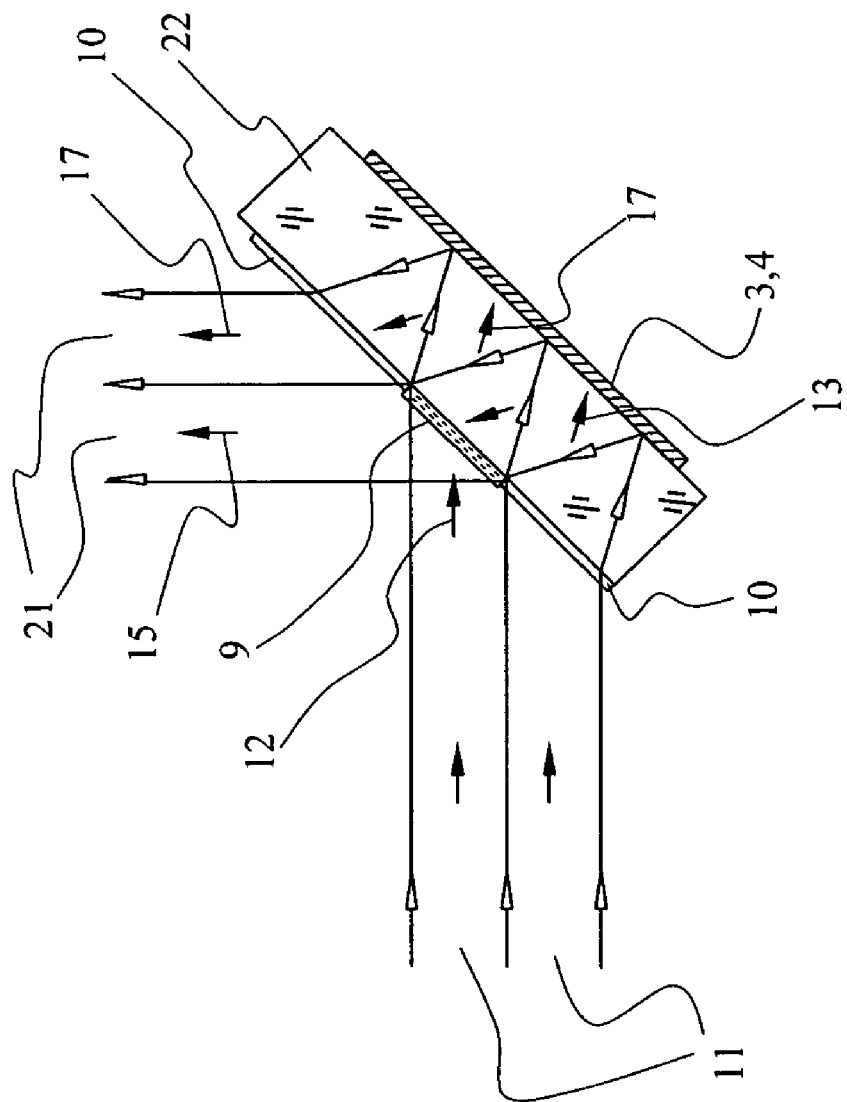
FIG. 6 shows a schematic representation of a fourth embodiment of the apparatus according to the invention having homogenizing and light deflecting function.

The embodiment of the apparatus according to the invention shown in FIG. 6, allows for both homogenizing and light deflecting functions. The apparatus comprises a single plane-parallel plate 22. The first optical surface of the plate 22 is provided with the partially reflecting optical surface 9 and the antireflection coatings 10; the second optical surface of the plate 22 is provided with the fully reflecting optical surface 3, which extends over the total aperture of the light flows and output light flows. Here, the fully reflecting surface 3 has a double function: firstly, it serves as deviation mirror for the light flow 13 and, secondly, as the light flow output 4 which aligns the coaxially superimposed output light flow 17 in parallel to the output light flow 15. The integral output light flow 21 is directed at a right angle to the input light flow 11. This means, the apparatus serves as a homogenizing deviation mirror. At a non-homogeneity of the total output light flow of 4%, the apparatus exhibits a very low light flow loss of less than 1.5%.

Figure 7:
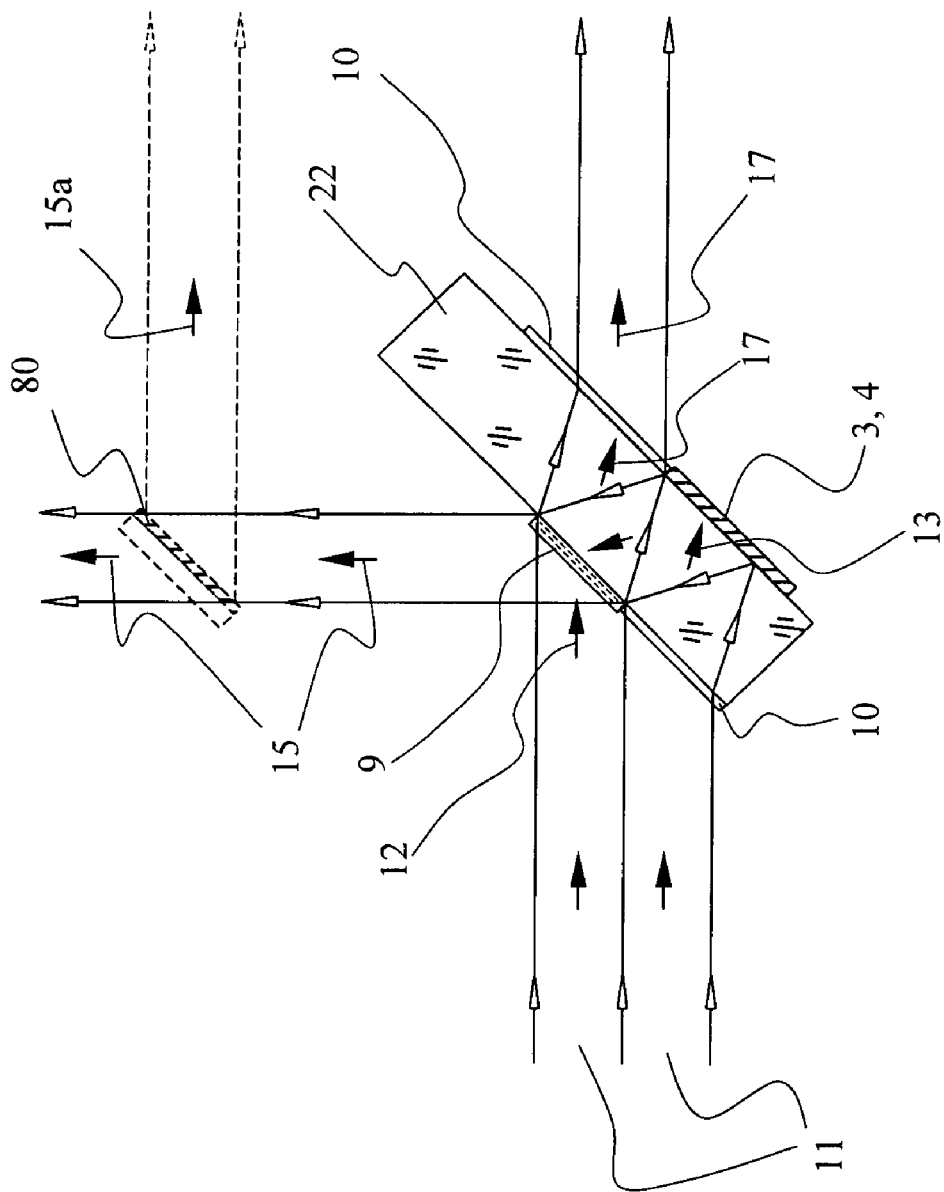
FIG. 7 shows a schematic representation of a variant of the fourth embodiment of the apparatus according to the invention of FIG. 6 having light flow splitting and homogenizing function.

FIG. 7 shows a simple modification of the apparatus according to FIG. 6 in order to convert it into a homogenizing beam splitter. To this end, the fully reflecting optical surface 3 is arranged only over the cross-section of the light flow 13, so that the output light flow 17 passes further through the plate 22, while the output light flow 15 is deflected as in FIG. 6. Thus, two output light flows 15 and 17 are output separately from each other. An additional fully reflecting mirror 80 can be provided here in order to deviate the output light flow 15 once more and thus to align the two separate output light flows 15 and 17 in parallel to each other.

Figure 8:
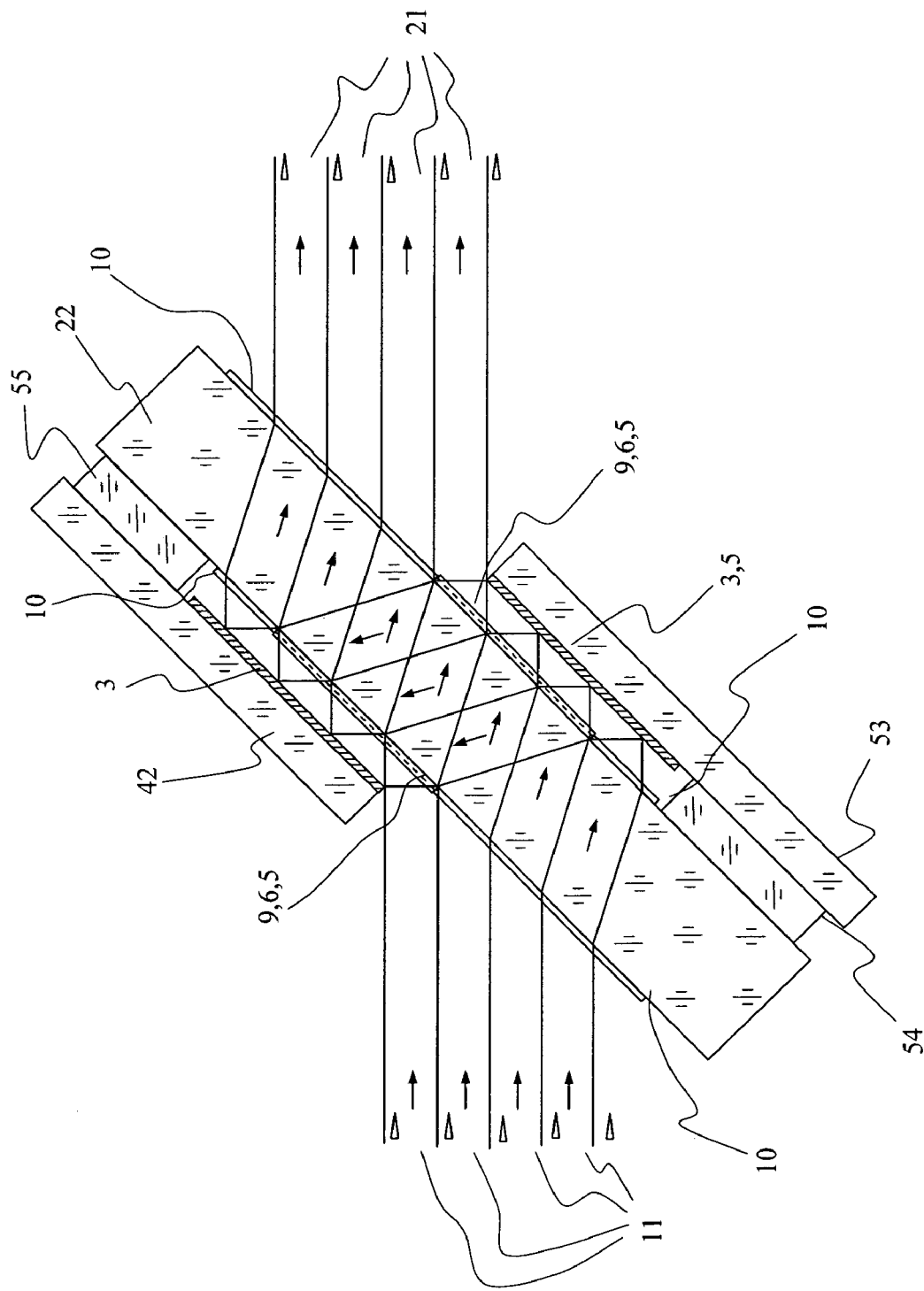
FIG. 8 shows a schematic representation of a fifth embodiment of the apparatus according to the invention having homogenizing function.

By means of the embodiment of the apparatus according to FIG. 8, the distribution of the flux density of the input light flow may be still further homogenized. The apparatus according to FIG. 8 comprises the plane-parallel plate 22 having partially reflecting optical surfaces 9 on both sides, each of which covers ¾ of the light flow cross-section. The remaining partial areas of the optical aperture are coated with antireflection layers 10. The further plates 42, 53 having the fully reflecting optical surfaces 3 are positioned in parallel to the plate 22 with the aid of the spacers 54, 55. In this case, the input light flow 11 is split-up into four light flows.

Figure 9:
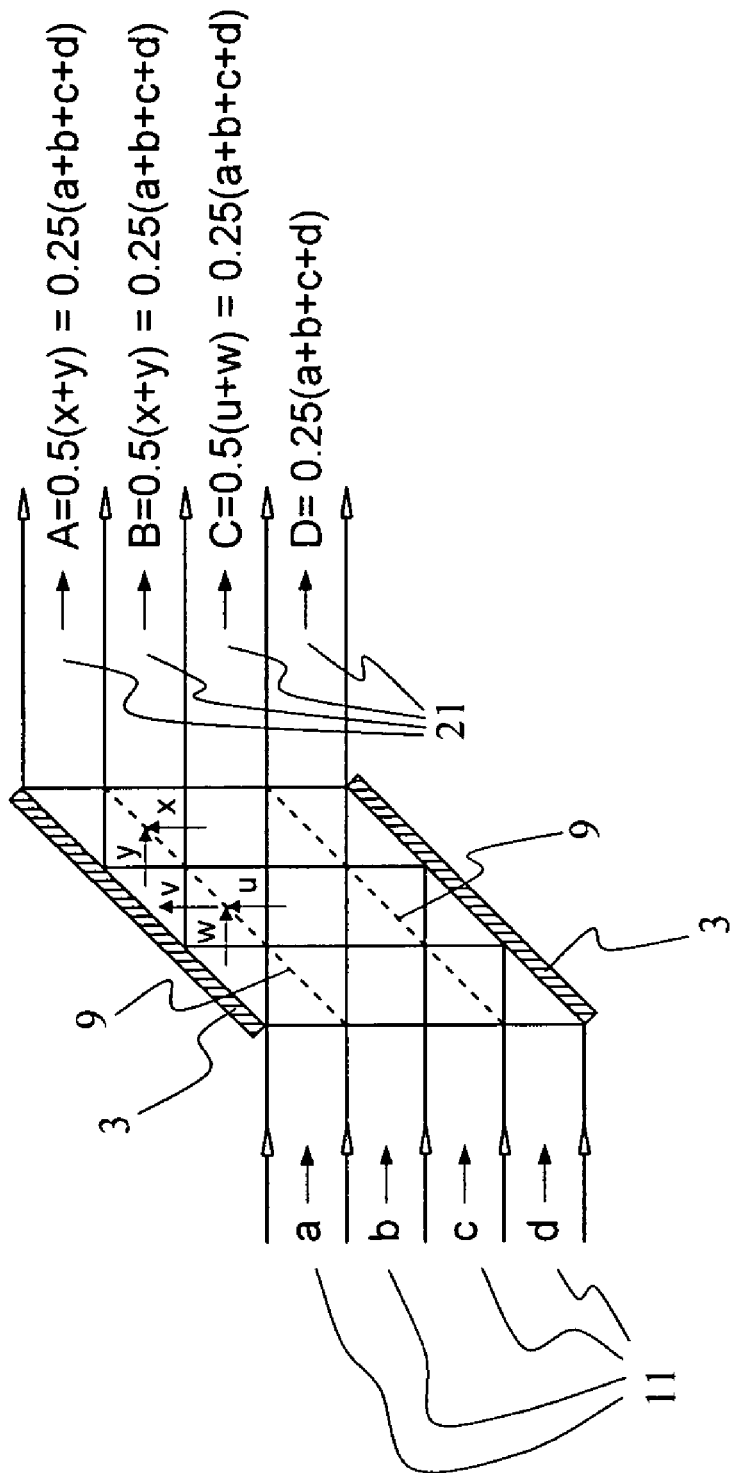
FIG. 9 shows a simplified schema of the fifth embodiment of the apparatus according to the invention.

FIG. 9 shows a simplified schema explaining the mechanism of the treatment of the light in the apparatus according to FIG. 8, without consideration of the refraction effects. The input light flow 11 is split-up by several reflections, which each only act upon the cross-sectional fraction of one light flow a to d of the input light flow. In part, this cross-sectional splitting-up takes place at one of the partially reflecting optical surfaces 9 as, for instance, the splitting of the light flow a. For some of the light flows the splitting-up does not take place immediately at the entrance of the apparatus but almost at the end of the of treatment steps. For instance, the light flows b and c are finally separated from each other only at the partially reflecting optical surface 9 in the course of forming of the output light flows A and B. The formation of the coaxially superimposed partial flows or output light flows A, B, C and D follows the above-described method which is depicted in FIG. 2 and FIG. 3. In the present case, this method is subsequently executed several times, an output light flow formed by a preceding execution of the method being used as an input light flow in one of the following executions of the method. In such a way, the couple v of the superimposed partial flows, which are formed from fractions of "inner" output light flows u and w, is output as a further "inner" output light flow y, and is provided as an input light flow for the next combination step with fractions of the light flow x, to form the output light flows A and B. Finally, the partial flows a, b, c, d are superimposed into four output light flows A, B, C, D, each of which comprises ¼ of the flux density of each light flow. Here, flux density fractions of $½^m$ from each of the light flows a, b, c and d get into each of the output light flows A, B, C and D via the superimposed partial flows, m being an integer number greater than 1. The difference in the numbers of reflections for each of the partial beams superimposed with each other is equal to 2, 4 or 6. The non-homogeneity of the distribution of the total output light flow 21 amounts to 2% at a light flow loss of about 3%.

Figure 10:
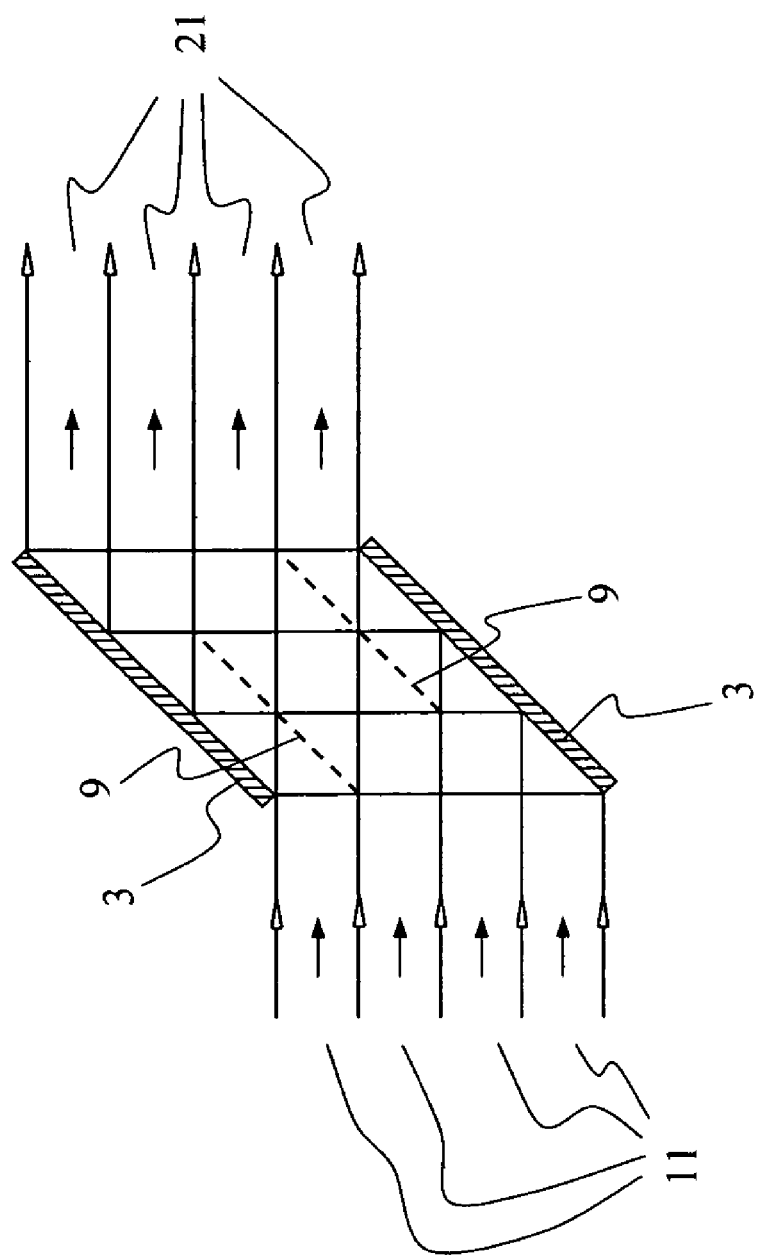
FIG. 10 shows a simplified schema of a first variant of the fifth embodiment of the apparatus according to the invention.

A simplified schema of a variant of the apparatus according to FIG. 8 or FIG. 9 is shown in FIG. 10, which has smaller partially reflecting optical surfaces 9, each of which only covers a half of light flow cross-section. The steps of light treatment as well as the functionality of the apparatus, however, remain almost the same.

Figure 11:
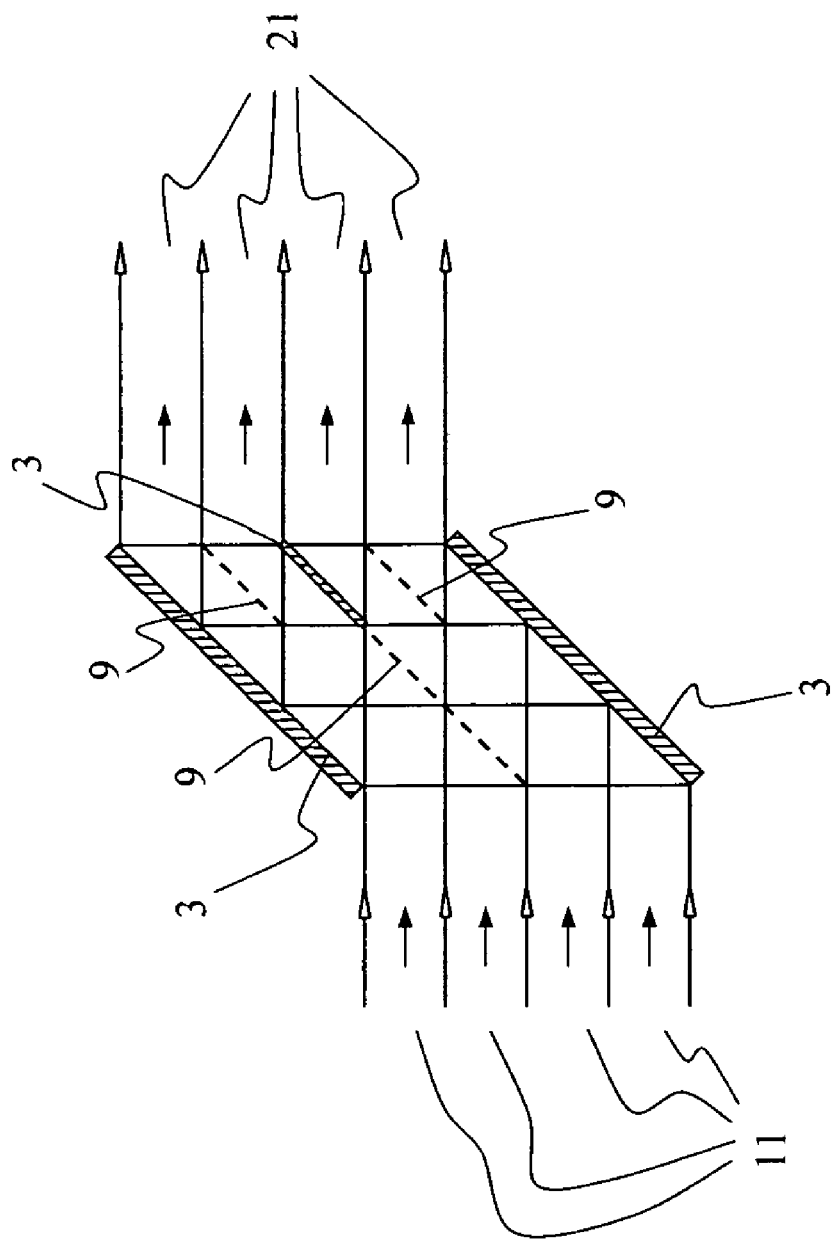
FIG. 11 shows a simplified schema of a second variant of the fifth embodiment of the apparatus according to the invention.

The apparatus according to FIG. 11, which depicts a simplified schema of a further variant of the apparatus according to FIG. 8 or FIG. 9, shows a system of five plane-parallel reflecting surfaces. These include two outer fully reflecting optical surfaces 3, each of which covers ¾ of the light flow cross-section, a central partially reflecting optical surface 9, which covers ½ of the light flow cross-section, and two lateral optical surfaces 9, each of which only covers ¼ of the light flow cross-section, as well as one central fully reflecting optical surface 3 of the same dimension, which reflects at both sides. These reflecting surfaces are provided as a "hybrid" layer system on several plates (not shown in FIG. 11), as in the apparatus according to FIG. 8. The light flow treatment takes place according to the method already described above, starting with a 2-way splitting-up of the input light flow 11 at the central, partially reflecting optical surface 9. The output light flows resulting from the first treatment step are separately taken over in the second stage of the method. Here, a further 2-way splitting-up into further light flows takes place at the lateral optical surfaces 9. The superimposed partial flows are output as four output light flows which form an integral output light flow 21.

Each of the above-mentioned methods, which is based on one of the apparatuses according to FIG. 8, FIG. 9 and FIG. 10, allows for the function of a homogenizing beam splitter, which outputs several output beams separately from each other, by means of a simple modification, e.g. by means of inclining or removing the fully reflecting light flow output (not shown in these figures). The apparatuses exhibit a significantly improved mechanical and thermal stability as well as the capability of a controlled increase of the pulse duration of a pulsed input light flow.

Figure 12:
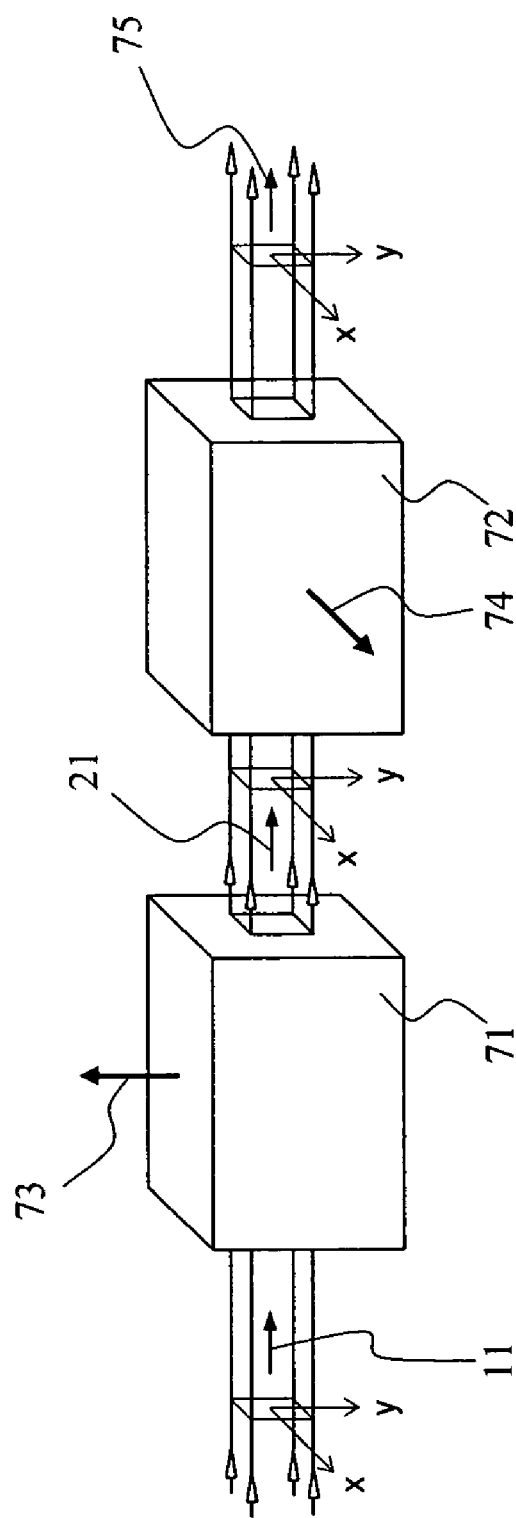
FIG. 12 shows a schematic representation of an arrangement of two apparatuses according to the invention.

FIG. 12 depicts an arrangement of two apparatuses according to the present invention, by means of which the described method of light flow treatment is executed two times, one after the other. An output light flow 21 of the first execution of the method with the aid of the first apparatus 71 is introduced into a second apparatus 72 as an input light flow for the second execution of the method. Each splitting plane, along which the input light flow 11 is split-up in the first apparatus 71, runs in parallel to the plane, which is defined by the direction of the input light flow 11 and an arrow 73 in y-direction. In the second apparatus 72, each splitting plane runs at right angles to each splitting plane of the first apparatus 71 so that the planes of the second apparatus 74 are defined by the direction of the light flow 21 and an arrow 74 in x-direction. In this way, an output light flow 75 homogenized in both x- and y-directions is produced.

Figure 13:
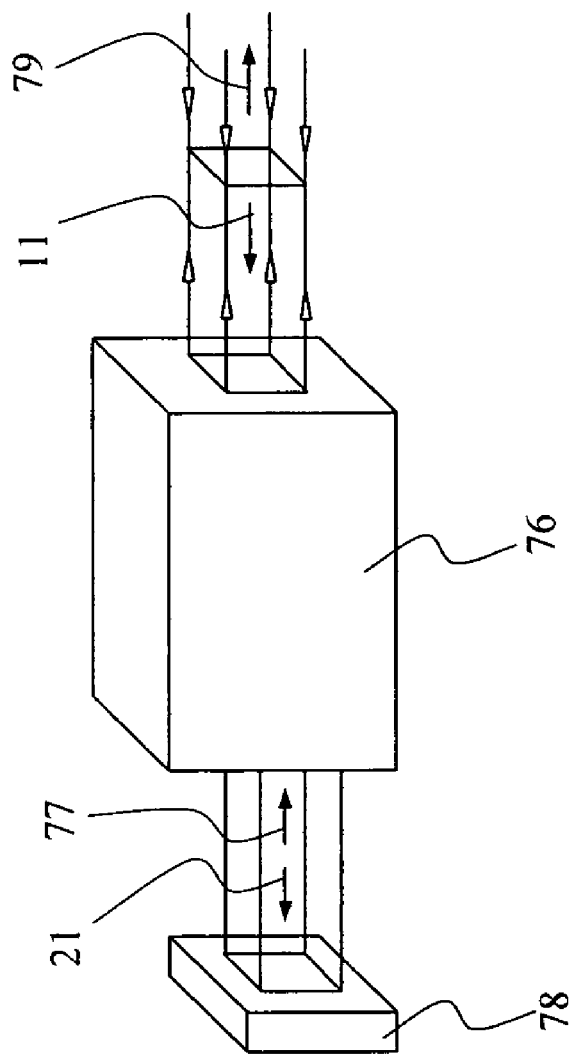
FIG. 13 shows a schematic representation of an arrangement of one apparatus according to the invention.

FIG. 13 shows an arrangement of one apparatus according to the invention, in which the method of present invention is executed within a laser cavity or a laser amplifier. Here, the input light flow 11 is homogenized in one apparatus according to the method described above, and output as output light flow 21. A mirror 78 reflects the output light flow 21 in such away that it falls as an input light flow 77 into the light flow output of the apparatus 76, coaxially to the output light flow 21. After a second treatment step performed in the same apparatus 76, it is output as a falling back output light flow 79. Thus, the arrangement has the function of a homogenizing mirror, so that a laser or a laser amplifier, which comprises this arrangement as a cavity mirror, exhibits a homogenized output laser beam flow.

LIST OF REFERENCE NUMERALS

1 Prism
2 Prism
3 Fully reflecting optical surface
4 Light flow output
5 Beam splitter
6 Beam divider
8 Plate
9 Partically reflecting optical surface
10 Antireflection coating
11 Input light flow
12 Light flow
13 Light flow
15 Output light flow
17 Output light flow
19 Distribution
20 Distribution
21 Integral output light flow
22 Plate
42 Substrate
43 Compensation plate
53 Substrate
54 Spacer
55 Spacer
71 Apparatus
72 Apparatus
73 Arrow
74 Arrow
75 Output light flow
76 Apparatus
77 Input light flow
78 Mirror
79 Output light flow
80 Fully reflecting mirror

The invention claimed is:

1. An apparatus for distributing the flux density of an input light flow, the apparatus comprising:
   a beam splitter having at least one fully reflective mirror surface, each of the at least one fully reflective mirror surfaces extending over only a cross-sectional part of the input light flow, said beam splitter splitting-up the input light flow into at least two light flows, each of the at least two light flows comprising a different cross-sectional part of the input light flow;
   a beam divider having a partially reflecting optical surface, said beam divider extending over the entire cross-section of two partial light flows and coaxially superimposing the two partial light flows, each of which comprises a flux density fraction of at least one of the light flows, in order to form a first output light flow in a first direction, and coaxially superimposing two further partial light flows, each of which comprises two further flux density fractions of the same light flows as used for forming the first output light flow, in order to form a further output light flow in a further direction; and a light flow output outputting the first output light flow and the further output light flow.

2. An apparatus for distributing the flux density of an input light flow, said apparatus comprising:

a plane-parallel plate made of transparent material, said plate comprising a partially reflecting optical surface at its front side facing the input light flow, and a fully reflecting optical surface at its rear side, wherein the partially reflecting optical surface acts upon a light flow which comprises a half of the cross-sectional area of the input light flow, and wherein an other light flow which comprises the remaining half of the cross-sectional area of the input light flow is deflected by said fully reflecting optical surface through said transparent plane-parallel plate towards said partially reflecting optical surface, so that by means of partial reflections of both light flows at said partially reflecting optical surface two partial flows each of which comprises a half fraction of the flux density of both light flows are coaxially superimposed in a first direction in order to form a first output light flow, and two further partial light flows each of which comprises the other half fraction of the flux density of both light flows are coaxially superimposed in a further direction in order to form a further output light flow.

3. The apparatus of claim 2, wherein the further output light flow emerges from the plane-parallel plate passing by the fully reflecting optical surface in another direction than the first output light flow.

4. The apparatus of claim 2, wherein the partially reflecting optical surface is selected from the group of polarizing and partially polarizing optical surfaces.

5. The apparatus of claim 4, wherein the partially reflecting optical surface includes a partially polarizing optical multi layer which essentially exhibits equal transmission and reflection coefficients for non-polarized light.

6. An apparatus for distributing the flux density of an input light flow, said apparatus comprising:

a plane-parallel plate made of transparent material, said plate comprising a partially reflecting optical surface at its front side facing the input light flow, and a fully reflecting optical surface at its rear side, wherein the partially reflecting optical surface acts upon a light flow which comprises a half of the cross-sectional area of the input light flow, and wherein an other light flow which comprises the remaining half of the cross-sectional area of the input light flow is deflected by said fully reflecting optical surface through said transparent plane-parallel plate towards said partially reflecting optical surface, so that by means of partial reflections of both light flows at said partially reflecting optical surface two partial flows each of which comprises a half fraction of the flux density of both light flows are coaxially superimposed in a first direction in order to form a first output light flow, and two further partial light flows each of which comprises the other half fraction of the flux density of both light flows are coaxially superimposed in a further direction in order to form a further output light flow, wherein the partially reflecting optical surface is selected from the group comprising polarizing and partially polarizing optical surfaces for reduction of interference effects with regard to the superimposed partial flows.

7. The apparatus of claim 6, wherein the partially reflecting optical surface includes a partially polarizing optical multi-layer which essentially exhibits equal transmission and reflection coefficients for non-polarized light.

* * * * *